United States Patent [19]

Koch et al.

[11] Patent Number: 4,484,247

[45] Date of Patent: Nov. 20, 1984

[54] NONFRAGMENTING STATION ARRESTER

[75] Inventors: Robert E. Koch; Earl W. Stetson, both of Pittsfield, Mass.

[73] Assignee: General Electric Company, King of Prussia, Pa.

[21] Appl. No.: 587,758

[22] Filed: Mar. 9, 1984

[51] Int. Cl.³ ............................................ H02H 1/04

[52] U.S. Cl. .................................... 361/128; 361/127; 313/231.11; 313/231.21; 315/36

[58] Field of Search ............... 361/123, 127, 128, 126, 361/130; 315/36; 313/231.11, 231.21

[56] References Cited

U.S. PATENT DOCUMENTS 3,290,547 12/1966 Sankey ............................ 361/128 X 3,497,764 2/1970 Smith, Jr. ....................... 361/127 X 3,588,578 6/1971 Clinkenbeard ............ 313/231.11 X

*Primary Examiner*—Reinhard J. Eisenzopf

*Attorney, Agent, or Firm*—Robert A. Cahill; William Freedman

[57] ABSTRACT

A lightning arrester of the station class is equipped with a ceramic housing protective heat shield liner formed of an ablative material capable of giving off a gas when subjected to a fault current arc. The evolved gas contributes to a rapid internal pressure buildup calculated to rupture housing end sealing diaphragms and quickly vent the arrester housing interior to prevent housing fracture. The arrester end structures are provided with expansive radial vents to accommodate unimpeded internal pressure relief.

4 Claims, 4 Drawing Figures

NONFRAGMENTING STATION ARRESTER

The present invention relates to lightning arresters and particularly to a station class lightning arrester constructed to inhibit failure induced fragmentation of its ceramic housing.

BACKGROUND OF THE PRESENT INVENTION

Applicants' copending application Ser. No. 235,906, filed Feb. 19, 1981, now U.S. Pat. No. 4,463,405 and assigned to Electric Power Research Institute, discloses a nonfragmenting distribution arrester having an ablative heat shield liner disposed against the interior surface of the porcelain housing. This liner insulates the housing from the thermal shock of an impinging arc precipated by the failure of one or more of the varistor elements within the housing. In addition, the ablative property of the liner material causes the evolvement of a considerable quantity of gas in the presence of an arc, which contributes to a rapid buildup in internal pressure. Before the internal pressure can achieve magnitudes sufficient to burst the housing, one or both of the sealing diaphragms at the ends of the housing and the associated housing end caps are blown off to promote essentially unrestricted and virtually instantaneous internal pressure relief.

While this construction has proven effect in avoiding fragmentation of a distribution arrester housing, its principles are not fully adaptable to the very much larger station class arresters. For one thing, station arresters are typically stacked physically one atop the other and electrically interconnected in series to meet the high voltage ratings of a typical application. Thus, effective internal pressure relief cannot be achieved by having the arrester end structures blow off.

Currently, to inhibit housing fractures under the unusual conditions of internal varistor element failure, station arresters utilize end structures equipped with oppositely directed nozzles for directing the ionized gases generated by an internal fault current arc along the exterior surface of the housing. When these gases meet, an external line-to-ground flashover is created shunting the failing varistor elements. At the high rated fault current withstand of a station arrester, this transfer of the fault current arc from the interior to the exterior of the arrester housing occurs sufficiently rapidly (typically in the first half cycle of a 60 Hz fault current) to save the housing from violent rupture. In order to achieve this flashover, the venting nozzles must of necessity be very restrictive to the free flow of high pressure gases. Thus, if the fault current arc does not rapidly transfer to an external flashover, the internal pressure can rapidly build to a housing fracturing level. Further complicating the matter is the fact that an arrester may fail over a wide range of fault current magnitutes and/or under a variety of adverse weather conditions, e.g., high winds, heavy rain, icing, etc. Possibly, the vent nozzles could become blocked or become even more restricted due to the entry of foreign matter. The effects of these various conditions on the speed of arc transfer is not known. In any case, it is appreciated that should the housing disintegrate, fragments are propelled at extreme velocities, posing serious hazzards to personnel and equipment in the vicinity.

It is accordingly an object of the present invention to provide a high voltage rated lightning arrester capable of avoiding housing fragmentation during a failure mode.

A further object of the invention is to provide a nonfragmenting lightning arrester of the above character which is constructed to reliably inhibit housing failure under all levels of fault current conditions and adverse weather conditions.

Another object of the present invention is to provide a nonfragmenting lightning arrester of the above character which is efficient in construction and reliable in operation.

Other objects of the invention will in part be obvious and in part appear hereinafter.

SUMMARY OF THE INVENTION

In accordance with the present invention, there is provided a high voltage lightning arrester, which is uniquely constructed to resist housing fragmentation, even when applied to a stacked, station arrester application. Disposed within the arrester against the interior housing surface is a heat shield liner formed of an ablative material, such as rag paper, capable of evolving a considerable quantity of gas when subjected to a fault current arc. In addition, this liner insulates the housing from the thermal shock it would be subjected to but for presence of the liner.

Each end of the arrester housing is sealed off by a frangible metal disk or diaphragm which is designed to rupture and vent a large internal arrester air space, greater in cross-sectional area than that of the varistor stack, in the event of a pressure increase induced by an internal fault current arc.

The end structures of the arrester beyond the diaphrams are constructed to accommodate bolted physical connection of plural arresters one atop the other and electrical connection of the plural arresters in series as is common in station arrester applications. In addition, these end structures or electrodes are fashioned to provide expansive lateral or radial ports whose cummulative cross-sectional area is at least three times the cross-sectional area of the arrester internal air space cross-sectional area. As a result, when the diaphragms rupture to vent the housing interior and relieve a failure mode pressure buildup, the vented gases are exhausted from these lateral ports to achieve unimpeded pressure relief in sufficiently rapid fashion as to prevent fracture of the arrester housing.

The invention accordingly comprises the features of construction and arrangement of parts which will be exemplified in the construction hereinafter set forth, and the scope of the invention will be indicated in the claims.

For a better understanding of the venture and objects of the invention, reference should be had to the following detailed description taken in conjunction with the accompanying drawings, in which:

DESCRIPTION OF THE DRAWINGS

Corresponding reference numerals refer to like parts throughout the several views of the drawings.

DETAILED DESCRIPTION

Figure 1:
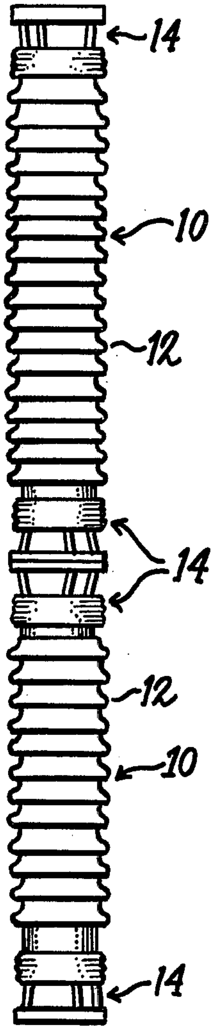
FIG. 1 is an elevational view of a pair of high voltage lightning arresters constructed in accordance with the present invention and stacked together in a typical station arrester configuration.
Figure 3:
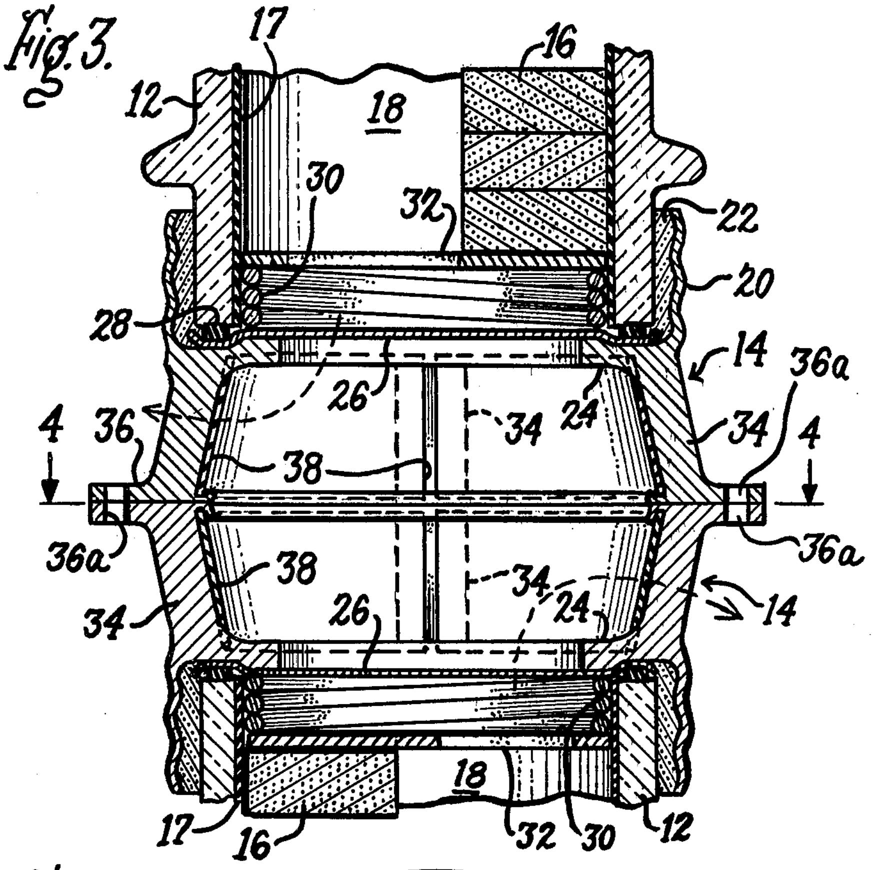
FIG. 3 is an enlarged vertical sectional view, partially broken away, of the joined end structures of the stacked station arresters of FIG. 1.

The high voltage lightning arrester of the present invention, generally indicated at 10, is shown in FIG. 1 in a typical station arrester configuration with two such arresters physically stacked one atop the other and electrically connected in series. It will be understood that some station arrester applications may call for more than two stacked lightning arresters. Each arrester includes a hollow, generally cylindrical or tubular housing 12 of porcelain or other suitable weather-resistant material having the requisite mechanical strength and dielectrical properties. The housing is formed with a series of skirts to provide the necessary oversurface electrical clearance between the electrode structures, generally indicated at 14, at the ends of the arrester housing. Contained within the housing of each arrester is a stacked array of nonlinear resistance valve elements, such as zinc oxide varistor disks 16 seen in FIG. 3, which are electrically in series between the electrode end structures 14. As seen in FIG. 3, the varistor stack occupies considerably less than half the total volume within housing 12, leaving a rather expansive air space 18 which is an important feature of the present invention. Also accommodated within the housing is a heat shield liner 17 (FIG. 3) overlying the interior surface of the housing. This liner is formed of an ablative material, such as rag paper, having the property of evolving a considerable quantity of gas when subjected to an electric arc.

Figure 2:
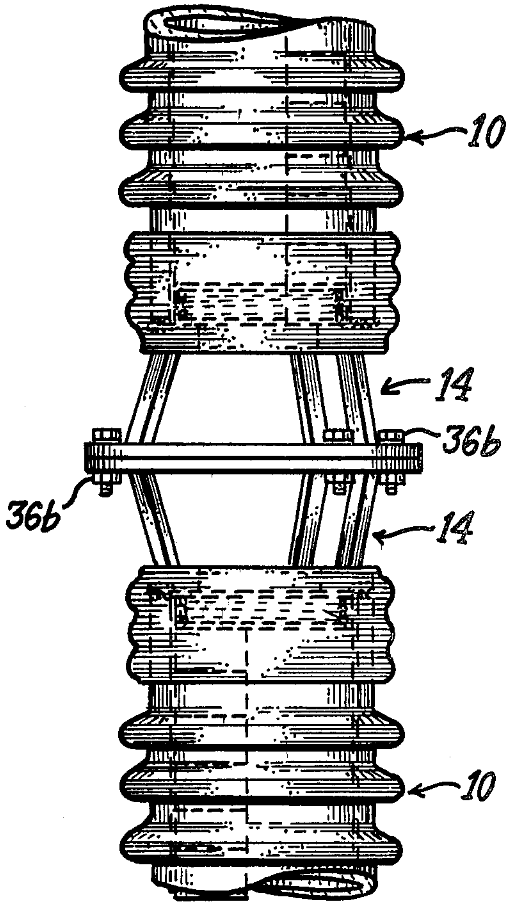
FIG. 2 is an enlarged elevational view, partially broken away, of the station arresters of FIG. 1.

Referring to FIGS. 2 and 3, each electrode end structure 14, which may be a single metal casting or fabricated from its several parts, includes a corrugated sleeve portion 20 dimensioned to receive an end of housing 12. A suitable cement 22 secures the electrode structure to the housing end. Extending inwardly behind the butt end of the arrester housing is an annular shoulder 24 which serves as a seat for a frangible metal diaphram 26 sealing off the open end of housing 12. An annular gasket 28 disposed between the butt end of the housing and the outer marginal portion of the diaphragm renders this housing seal airtight.

Figure 4:
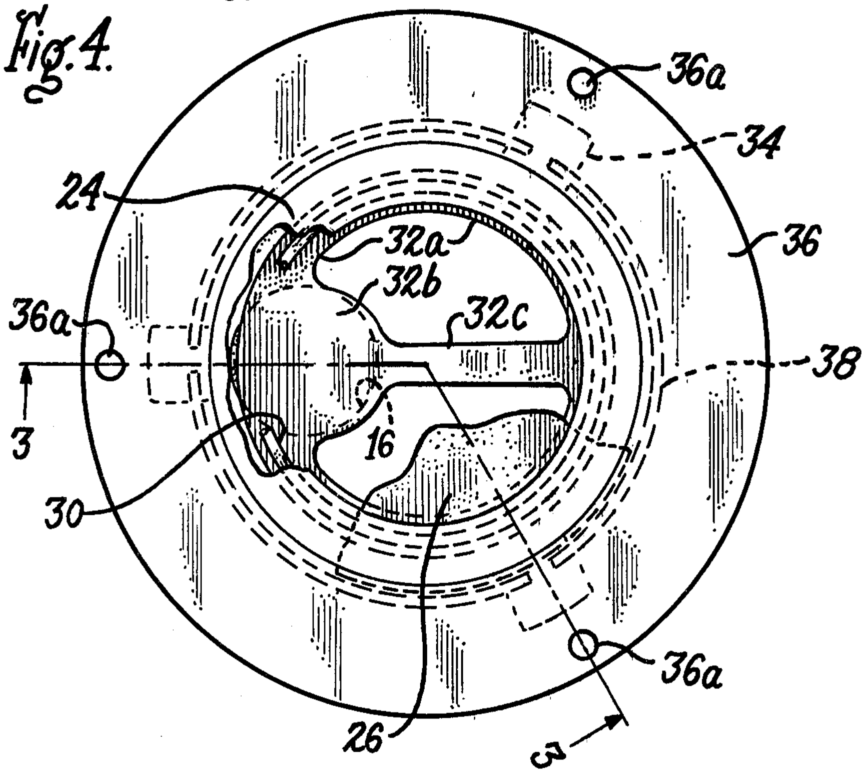
FIG. 4 is a sectional view taken along line 4—4 of FIG. 3.

Also seated on shoulder 24 is a coiled compression spring 30 which acts against a varistor stack retainer 32 pursuant to maintaining the varistor stack position within the housing and to assure positive electrical contacting engagement between the electrodes on the opposed faces of the individual varistor disks 16. As best seen in FIG. 4, metallic retainer 32 is formed having an outer ring **32*a* against which the end coil of spring 30 bears. Integral with ring 32*a* is a circular seat 32*b* for supporting and retaining the varistor stack. To give this varistor stack support sufficient rigidity, a reinforcing rib 32*c* joins seat 32*b* with a diametrically opposed section of ring 32*a*. As can be seen, retainer is virtually wide open to the air space 18** within the arrester housing.

Projecting from the junction of sleeve 20 and shoulder 24 are, in the illustrated embodiment of the invention, three legs 34 which are joined at their free ends by an annular mounting ring 36. As best seen in FIG. 3, this mounting ring is provided with holes **36*a* which accept bolts 36*b* (FIG. 2) for clamping the electrode structures 14 of two arresters 10 in stacked relation. It is seen that the bolted together electrode structures provides for a virtually wide open air space between vertically adjacent arresters. Preferably, the electroded structures are provided with blowout, snap-fit plastic panels 38 of arcuate shape to span the spaces between legs 34** and thus discourage the entry of foreign matters into the open space between arresters.

When a fault current arc develops within the arrester housing due to the failure of one or more of the varistor elements 16 therein, the housing internal pressure increases. As this arc impinges upon liner 17, gases evolve to dramatically increase the internal pressure buildup. This pressure acts upon the diaphrams 26 at each end of the arrester housing which are designed to rupture when the internal pressure exceeds a predetermined level. Preferably, these diaphragms are notched so as to establish a reasonably well defined rupturing pressure level. As the diaphrams rupture, the interior of the housing is vented to the open space of the electrode end structure. With virtually no delay, panels 38 are blown out to achieve rapid and essentially unimpeded relief of the housing internal pressure, thus relieving the housing of the potentially fracturing stresses in time to preserve its integrity.

Materially contributing to the nonfragmenting housing objective of the present invention is the large volume of the air space 18 within the housing relative to the volume occupied by the varistor stack. The air space serves to cushion the steep rise in internal pressure at the onset of a fault current arc. It also provides a large venting area at each end of the housing, each greater than the cross-sectional area of the varistor stack, through which the housing interior is exhausted as the diaphrams 26 rupture. Also significantly contributing to the objective of the present invention is the expansive open interior of the electrode end structures 14 and the cummulative lateral venting area provided by the ports between the three end structure legs 34. This lateral venting area is preferably at least three times the cross-sectional area of the housing air space 18. Yet another contributing factor is the vertical nonalignment of the air spaces in vertically adjacent arresters, as seen in FIG. 3. If these two arresters are vented at substantially the same time, the exhausting gas flows do not confront each other, and thus rapid relief of the internal pressures in the two housings is assured.

It will thus be seen that the objects set forth above, among those made apparent in the preceding description, are efficiently attained and, since certain changes may be made in the above construction without departing from the scope of the invention, it is intended that all matter contained in the above description or shown in the occompanying drawings shall be interpreted as illustrative and not in limiting sense.

Having described our invention, what we claim as new and desire to secure by letters patent is:

1. A high voltage lightning arrester comprising, in combination:
   - A. an insulative ceramic housing;
   - B. a column of nonlinear resistance valve elements situated within said housing, the arrester internal air space remaining in said housing having a cross-sectional area at the ends of said housing greater than the cross-sectional area of said valve element column;
   - C. an ablative heat shield liner overlying the interior surface of said housing;

D. a frangible diaphragm sealing off each end of said housing; and

E. an electrode end structure secured to each end of said housing, at least one of said end structures including (1) a metallic sleeve receiving an end of said housing, (2) an annular mounting ring adapted for bolted physical connection with the mounting ring of another like lightning arrester for applications where plural such arresters are stacked one atop the other, and (3) a plurality of legs projecting from said sleeve for supporting said ring in spaced relation to the end of said housing, the spaces between said legs providing lateral venting ports having a cummulative cross-sectional area at least three times greater than that of the internal air space.

2. The lightning arrester defined in claim 1, which further includes

A. a retainer disposed adjacent each end of said housing, each said retainer integrally formed having an annular ring portion and seat portion and otherwise providing open communication between the arrester internal air space and said diaphragm at the adjacent end of said housing, and B. a compression spring disposed adjacent each end of said housing, each said spring having an inner end acting against the ring portion of the adjacent one of said retainers, C. each said electrode end structure including an annular shoulder projecting inwardly beyond the adjacent butt end of said housing to provide a support for the outer end of the associated one of said springs, whereby said springs bias said retainer seat portions against the opposite ends of said valve element column to maintain its position within said housing and to promote good physical contacting engagement between said individual valve elements of said stack.

3. The lightning arrester defined in claim 2, wherein said diaphragms are sealed in place across the butt ends of said housing by said annular shoulders.

4. The lightning arrester defined in claim 3, which further includes pressure responsive popout covers closing off said venting ports.

* * * * *